(12) United States Patent
Smith

(10) Patent No.: US 10,683,041 B1
(45) Date of Patent: Jun. 16, 2020

(54) LIVE BOTTOM TRUCK/TRAILER MUD FLAP LIFT SYSTEM

(71) Applicants: Jeffrey A. Smith, Grayling, MI (US); Larry L. Smith, Gaylord, MI (US)

(72) Inventor: Larry L. Smith, Gaylord, MI (US)

(73) Assignee: Jeffrey A. Smith, Grayling, MI (US)

( * ) Notice: Subject to any disclaimer, the term of this patent is extended or adjusted under 35 U.S.C. 154(b) by 0 days.

(21) Appl. No.: 16/357,654

(22) Filed: Mar. 19, 2019

(51) Int. Cl.
  *B62D 25/18* (2006.01)
  *F16H 21/44* (2006.01)
  *B60P 1/00* (2006.01)

(52) U.S. Cl.
  CPC ......... *B62D 25/182* (2013.01); *B62D 25/188* (2013.01); *F16H 21/44* (2013.01); *B60P 1/00* (2013.01)

(58) Field of Classification Search
  CPC .... B62D 25/182; B62D 25/188; B62D 25/18; B62D 25/186; F16H 21/44; F16H 21/10; F16H 21/00
  See application file for complete search history.

(56) References Cited

U.S. PATENT DOCUMENTS

| | | | | |
|---|---|---|---|---|
| 2,857,200 A | * | 10/1958 | Hoppesch | B62D 25/188 298/1 SG |
| 2,981,553 A | * | 4/1961 | Zerbe, Sr. | B62D 25/188 280/851 |
| 3,248,126 A | * | 4/1966 | Saxton | B62D 25/188 280/851 |
| 3,507,513 A | | 4/1970 | Bohrer | |
| 3,582,109 A | | 6/1971 | Moore | |
| 3,806,197 A | * | 4/1974 | Knyszek | B62D 25/188 298/1 SG |
| 4,097,090 A | * | 6/1978 | Payne | B62D 25/188 280/851 |
| 5,125,674 A | * | 6/1992 | Manuszak | B62B 7/12 280/30 |
| 6,139,062 A | * | 10/2000 | Meyer | B60P 1/283 280/847 |
| 6,158,775 A | | 12/2000 | Nickels | |
| 6,623,038 B2 | * | 9/2003 | Heem | B62D 25/188 280/847 |
| 6,799,808 B1 | * | 10/2004 | Walters | B62D 25/188 280/851 |
| 6,880,894 B2 | | 4/2005 | Obermeyer | |
| 7,021,665 B2 | * | 4/2006 | Keller | B62D 25/182 280/154 |

(Continued)

*Primary Examiner* — James M Dolak
(74) *Attorney, Agent, or Firm* — Northern Michigan Patent Law, PLC

(57) ABSTRACT

A mud flap lifting system specifically for a live bottom type trailer vehicle in which asphalt or similar is dispensed from the rear of the trailer load box for a paving operation using a paving machine in tandem with the trailer. Pneumatic lift cylinders on each side of the trailer load box are used to retract and extend cables running rearwardly from the cylinders to and through cable guides positioned vertically above the mud flaps. The cables are operable to pull or lift the lower portions of the mud flaps upwardly and outwardly into curved configurations located above a paving machine roller as it engages the rear wheels of the trailer, and at a height designed to engage the paving machine hopper as it engages the trailer.

4 Claims, 7 Drawing Sheets

(56) References Cited

U.S. PATENT DOCUMENTS

| | | | |
|---|---|---|---|
| 7,850,206 B2 * | 12/2010 | Proctor | B62D 25/188 |
| | | | 280/848 |
| 8,303,044 B2 | 11/2012 | Obermeyer | |
| 8,579,314 B2 | 11/2013 | Prazen et al. | |
| 8,864,176 B2 * | 10/2014 | Lasser | B62D 25/188 |
| | | | 280/847 |
| 2004/0164539 A1 | 8/2004 | Bernard | |
| 2012/0068448 A1 * | 3/2012 | Lasser | B62D 25/182 |
| | | | 280/851 |

* cited by examiner

LIVE BOTTOM TRUCK/TRAILER MUD FLAP LIFT SYSTEM

RELATED APPLICATIONS/PRIORITY BENEFIT CLAIM

Not applicable.

FIELD

The subject matter of the present application is in the field of devices for temporarily lifting mud flaps on trucks and trailers.

BACKGROUND

Devices for temporarily lifting the mud flaps on trucks or trailers are known. These are usually applied to dump trucks to prevent the mud flaps from being torn off while dumping or during asphalt spreading operations.

U.S. Pat. No. 3,507,513 to Bohrer shows a retractable mud flap for trucks with a case mounted on the underside of the vehicle above the wheel, and a reciprocating carriage in the case connected to the mud flap by a hinge mechanism. The flap can be retracted by the carriage horizontally into the case from its vertical working position. The carriage mechanism in the case is protected by a sealing strip.

U.S. Pat. No. 3,582,109 to Moore shows an apparatus for retracting dump truck mounted mud flaps, in which the bottom ends of the mud flaps are affixed to the ends of a Y-shaped cable connected to a pneumatic cylinder by a pivotally mounted lever arm. The operating cylinder and cable are mounted centrally on the bed of the dump body to move therewith.

U.S. Pat. No. 6,158,775 to Nickels shows a mud flap lifting device with a cable having a first end attached to an intermediate portion of a mud flap. The device lifts the flap away from a truck's tires and prevents them from being torn off when the truck is backing up or dumping a load. Devices for lifting both flaps simultaneously as well as each flap individually are described. In one individual flap lifting version, the cable is attached to an intermediate portion of the mud flap at a forward or inside face of the mud flap, and pulls the mud flap forwardly up underneath the corner of the vehicle toward the rear tires.

U.S. Pat. No. 6,880,894 to Obermeyer shows a dump trailer for asphalt paving, with a mud flap mounting bracket suitable for use with a hingeably mounted dump bed. The mud flap mounting bracket is substantially parallel to a hinge arm for the dump bed, allowing the mud flap to be sufficiently displaced towards the rear of the trailer so as to not interfere with the hinge attachment during the raising and lowering process.

U.S. Pat. No. 7,850,206 to Proctor shows a mud flap lifting system for raising and lowering a pair of mud flaps, with a rotating shaft extending across the back of the vehicle and sheaves on the shaft aligned with each of the mud flaps to wind and unwind cables attached to the mud flaps.

U.S. Pat. No. 8,579,314 to Prazen et al. shows a removable mud flap assembly in which the mud flaps are easily removed from brackets on the vehicle without the use of tools.

U.S. Patent Application Publication No. US 2004/0164539 A1 to Bernard shows a mud flap lifter system in which the mud flaps are connected to a rod rotatable about a central axis so as to partially wrap the mud flaps around pairs of spaced, curved end plates to lift the mud flaps.

A "live bottom" truck or trailer is an alternative to a dump truck or an end dump trailer, commonly used in tandem with a hopper-equipped paving machine to pave roads with asphalt. Unlike the conventional dump truck, the tub does not have to be raised to deposit the load material; the live bottom trailer has a conveyor in the trailer tub or "box" that conveys the asphalt out the back of the trailer to a paving machine hopper, while the paving machine has a bumper or roller engaged with the rear wheels of the live bottom trailer to push the trailer at a controlled pace. The paving machine rollers frequently damage the live bottom vehicle's mud flaps during such a paving operation.

The prior art as exemplified by the above is not believed to be suitable for raising the mud flaps of a live bottom truck or trailer (hereafter trailer) in which asphalt is conveyed out of a central rear opening in the vehicle load box into a paving machine's hopper while the paving machine's rollers are engaged with the rear wheels of the vehicle.

BRIEF SUMMARY

The present invention is a mud flap lifting system for a live bottom trailer, especially a live bottom trailer that deposits asphalt into a paving machine engaging the rear wheels with a bumper or roller (or rollers) during the paving operation. The system comprises a pair of mud flap lift cylinders, one cylinder located on each side of the vehicle load box, the lift cylinders located forwardly of the rear wheels and the mud flaps. The lift cylinders are positioned on or above upper sides of the vehicle fenders exteriorly of the load box, preferably with the rear ends of the cylinders spaced above the fenders, and aligned with first cable guides. The first cable guides are located rearwardly of the lift cylinders, and positioned substantially vertically above their respective-side mud flaps. The lift cylinders and their respective cable guides are further preferably located inwardly of the fender outer edges relative to the load box. In a first form the first cable guides are elevated well above the fenders at a height above the lower end of the load gate, and the lift cylinders are oriented at an upward, rearward acute angle in alignment with the elevated cable guides; in a second form, the first cable guides are located substantially on the fenders at the rear end of the fenders and the lift cylinders are oriented substantially level with the fenders.

Cables operated by the lift cylinders extend rearwardly from the cylinders and through the first cable guides and downwardly over the outer, rear faces of the mud flaps to the lower ends of the mud flaps. The lift cylinders are capable of retracting the cables with a sufficiently long stroke to raise the lower ends of the mud flaps into a curved U- or J-shaped configuration above the centerline of the rear wheels and rearwardly up and away from the wheels and the underside of the fenders. In the raised position the lower portions of the mud flaps are substantially vertical, presenting a substantially vertical face for resilient engagement with an upper front portion of a paving machine hopper above the paving machine rollers.

The curved configuration of the mud flap in the raised position allows the mud flap to resiliently collapse against itself without contacting any other portion of the vehicle.

In a further form, intermediate cable guides are located between the first or upper cable guides and the mud flaps, in one form offset forwardly from the upper cable guides to feed the cable at a compound angle from the upper cable guides to the lower ends of the mud flaps.

These and other features and advantages of the invention will become apparent from the detailed description below, in light of the accompanying drawings.

DETAILED DESCRIPTION

Figure 1:
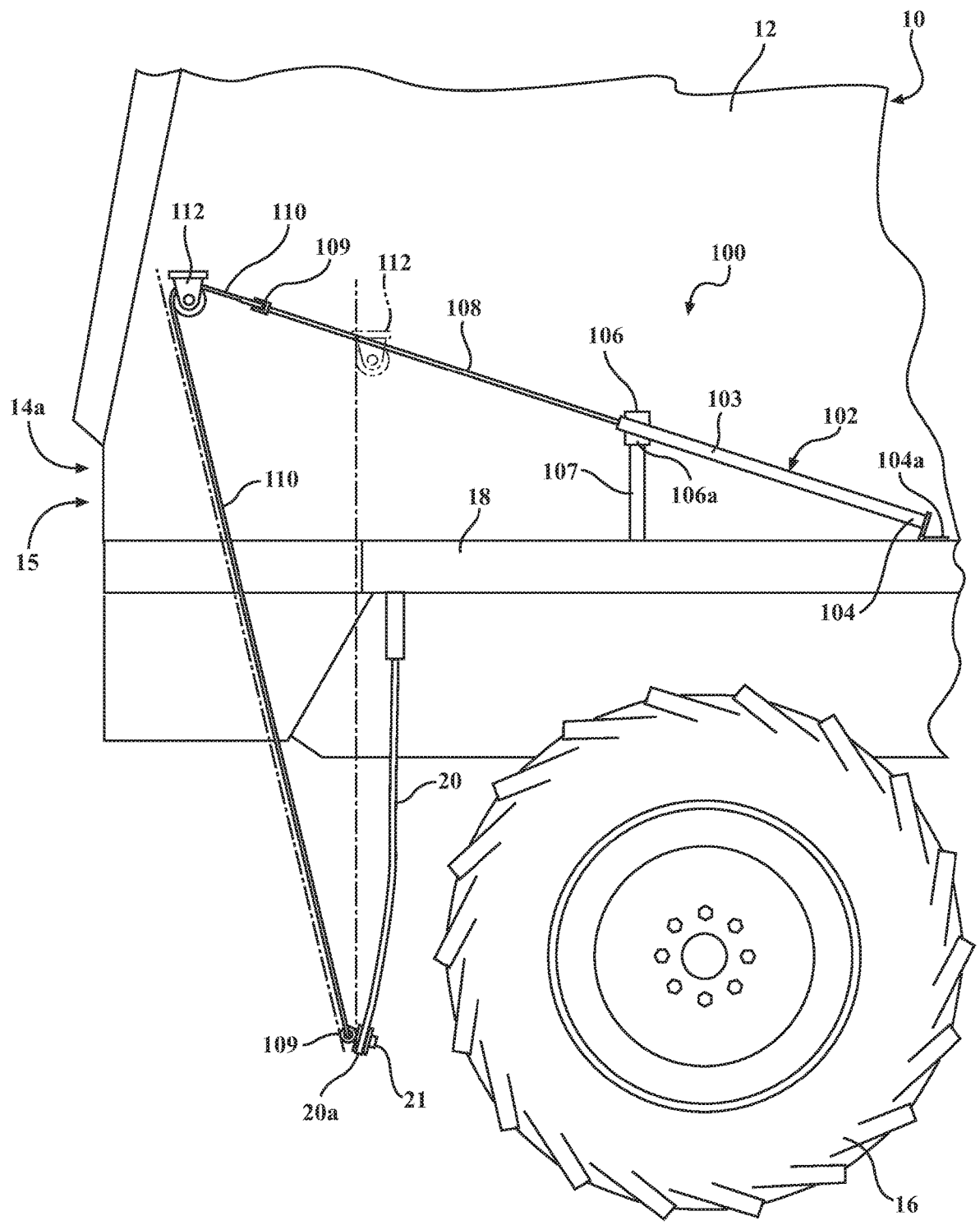
FIG. 1 is a side elevation view of an example mud flap lift system according to the present invention, located on one side of the schematically shown rear end of a live bottom truck or trailer vehicle.
Figure 2:
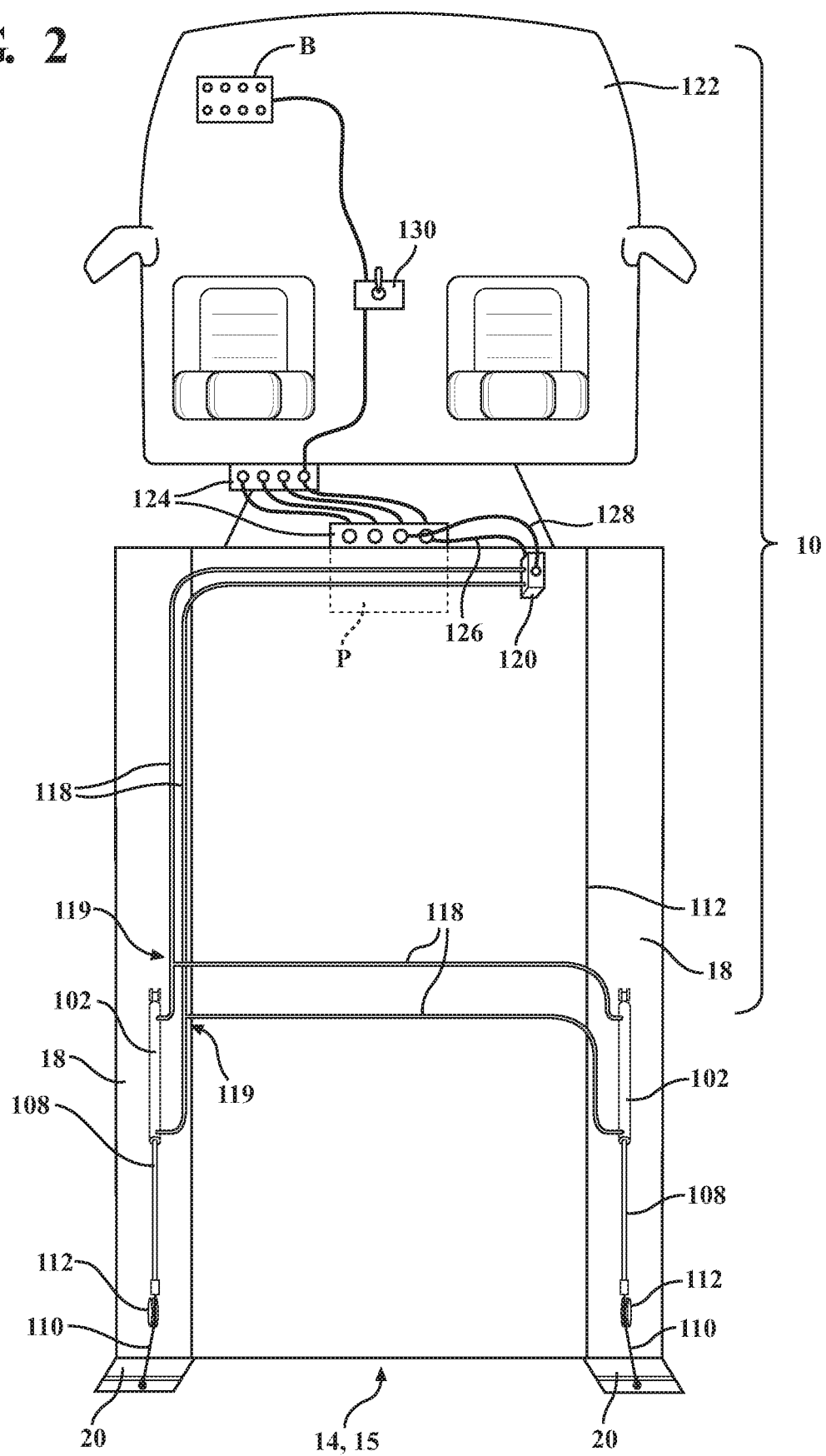
FIG. 2 is a schematic of an on-vehicle air supply and control system for the lift cylinder of FIG. 1.
Figure 3:
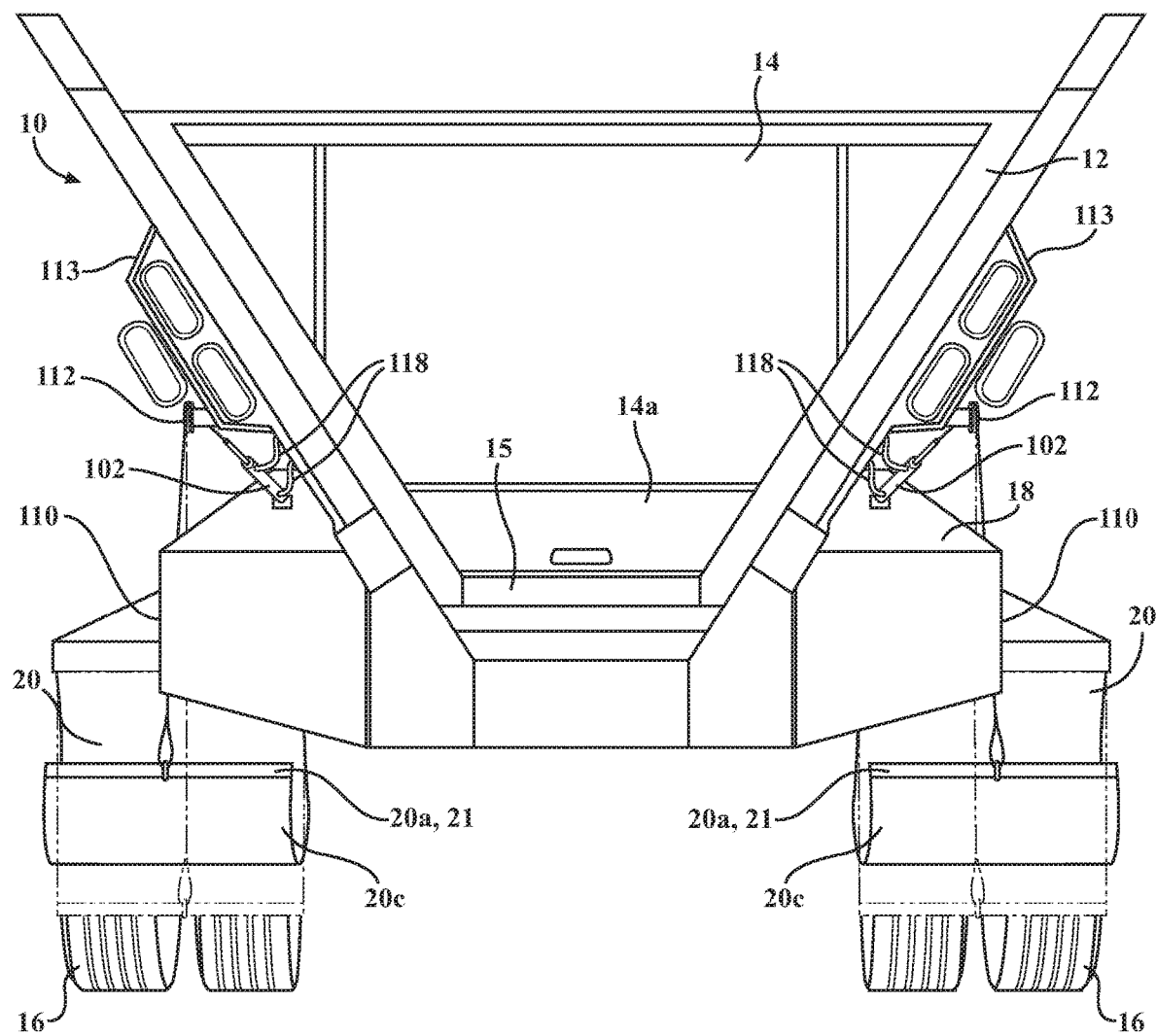
FIG. 3 is a rear perspective view of the vehicle of FIG. 1, showing lift cylinders of the mud flap lift system on each side of the vehicle load box.

Referring first to FIGS. 1 through 3, a mud flap lift system 100 is shown in exemplary form on a live bottom trailer vehicle 10 in order to teach how to make and use the claimed invention. Live bottom trailer 10 is schematically illustrated in the Figs. to represent a known type of load-delivery vehicle generally having a load box 12 for transporting a conveyor-dispensed material M, especially asphalt for a road or parking lot paving operation. Trailer 10 further includes a rear door or load gate 14 that can be opened remotely from controls in vehicle control cab 22 (FIG. 2), so that a conveyor 15 (FIG. 3) of known type inside the load box 12 can convey the load material out through the lower end 14a of the load gate 14 at the rear of the load box 12; rear wheels 16; protective fenders 18 located above wheels 16 and outwardly of the load box 12; and mud flaps 20 of known type for such vehicles located adjacent the rear wheels 16 and generally mounted on or near the rear end of fender 18 to hang vertically downward behind the rear wheels below the fenders. The details of the live bottom vehicle may vary from the schematically illustrated example, depending on make and model, as will be understood by those skilled in the art.

Mud flaps 20 in the illustrated system 100 comprise a durable, continuously flexible rubber-type material that can be repeatedly curled or curved 180° degrees into a U- or J-shaped configuration without damage or permanent deformation, and then returned by gravity to a substantially straight, vertical hanging orientation. Such mud flaps are, for example, commercially available from various truck and trailer retail stores.

Lift system 100 includes a linear-acting pneumatic lift cylinder located on each side of vehicle 10. Pneumatic lift cylinder 102 may be any of a number of known, commercially available types of air-driven cylinder, by way of non-limiting example 24"(inch)-stroke Nitra® brand pneumatic cylinders, mounted on or above the respective side's fender 18, with a front end 104 secured in place by a suitable bracket or equivalent connector 104a. In a first form shown in FIG. 1, a rear end 106 of cylinder 102 is spaced well above fender 18, for example with a bracket 106a on a vertical support 107, and is preferably also higher than front end 104 so that the cylinder 102 is mounted at an acute, upward angle relative to the rear of the vehicle 10 as illustrated. Cylinder 102 further comprises an operating rod 108 driven by an internal mechanism in known manner for extension from and retraction into the main tube 103 when an onboard air supply from lines 118 (FIGS. 2 and 3) is selectively activated to supply the cylinder with pressurized air. The stroke of cylinder 102 in the illustrated example of system 100 is fairly long, for example on the order of two (2) feet, although this may vary. In a second form shown in FIG. 1A, the cylinder 102 is mounted substantially level with the fender with the front and rear ends of the cylinder at about the same height.

A cable or similar strong flexible line or equivalent (strap, chain, etc., hereafter cable) 110 is connected at one end to the exposed end of cylinder operating rod 108 in known manner, for example at a bracket or eyelet 109 secured to the end of the operating rod and having a bore through which a loop of the cable 110 can be secured. The other end of cable 110 extends down over the outer, rear face of mud flap 20 and is connected to the lower end 20a of mud flap 20, preferably at the lowermost edge of the mud flap as illustrated, for example with a similar cable connector 109 secured to the mud flap 20. Further, the lower edge 20a of mud flap 20 is stiffened across its width, preferably with a width-wise bracket or strip 21 of relatively inflexible material such as metal or hard plastic bolted or otherwise secured to the mud flap, so that a lifting force exerted by cable 110 upon connector 109 is transferred evenly across the lower edge 20a of the mud flap.

In a first form, cable 110 is directed from cylinder 102 to the lower end of mud flap 20 by an elevated first upper cable guide 112 located rearwardly of cylinder 102, vertically above and generally aligned with mud flap 20 so that the rear part of cable 110 located between cable guide 112 and mud flap 20 drops essentially or more-or-less vertically downward toward the lower end of the mud flap. The cable guide 112 may accordingly be located essentially directly above the mud flap and/or the end of fender 18, as well as a range of positions rearwardly of the mud flap and/or end of the fender, as generally represented by the range of positions shown in broken lines in FIG. 1. In the first form shown elevated above fender 18, cable guide 112 may be mounted on an exterior side of the load box 12, either directly or by an intermediate spacing structure such as a bracket 113 added to or already found on the load box. In the illustrated example, the cable guide 112 is a pulley, guide wheel, curved tube or surface, or an equivalent structure around which the cable can smoothly slide as it is re-directed downwardly toward the mud flap. In the first form, elevated cable guide 112 is located on the vehicle 10 at a point higher than the rear end 102a of lift cylinder 102, aligned with the axis of operating rod 108 so that the forward part 110b of cable 110 extends at an acute angle upwardly from the cylinder 102 to cable guide 112. It is further preferred that where the elevated cable guide 112 associated with each mud flap 20 is located rearwardly of the end of fender 18, as shown in solid lines in FIG. 1, it is also located at a height greater than the height of the conveyor 15 at the lower end 14a of load gate 14 at the rear of the trailer, so that it is positioned well above the hopper of a paving machine coupled to the trailer during a paving operation and above the flow of material exiting the load gate.

Lift cylinders 102 may be supplied with air and operated to retract and extend the mud flap lift cables 110 using various combinations of known air valve controls and air supply features commonly used on commercial vehicles. In the illustrated example, each lift cylinder is supplied with air by two pneumatic supply lines 118, one connected at a forward end of the cylinder and one connected at a rear end of the cylinder, the supply lines routed exteriorly of or underneath the load box 12, as needed, to each of the lift cylinders. Although each lift cylinder 102 may be supplied by a separately controlled set of supply lines 118 and thus operated independently, in the illustrated example the lift cylinders 102 are operated simultaneously from a single pair of shared supply lines 118 split by T-connections 119 or similar. Air to the supply lines 118 is controlled by a pneumatic valve controller (or equivalent) 120 of known, commercially available type to alternately and oppositely supply pressurized air into and then exhaust each line 118. For example, pneumatic controller 120 may be a double action solenoid-type pneumatic control valve available from the Velvac Corporation.

Operation of pneumatic controller 120 can be from anywhere on trailer vehicle 10 convenient for the operator, but it is preferred that a switch console 130 be located inside a vehicle cab 122 forwardly of the trailer load box and powered from the vehicle electrical system schematically represented at B. A combination air/power junction box or boxes 124 of known, commercially available type (sometimes referred to as "glad hands" couplers) may be used between the switch console 130 and controller 120 to supply electrical power and air to the controller's solenoid valve and supply ports from respective onboard sources typically already existing on such vehicles, e.g. from the vehicle electrical system or dedicated battery through power line 126 and a pressurized air tank or compressor or similar pneumatic source schematically represented at P through main pneumatic supply line 128. For example, air/power junction boxes 124 shown in FIG. 2 may be a glad hands coupler system such as commercially available from the Velvac Corporation.

Figure 4:
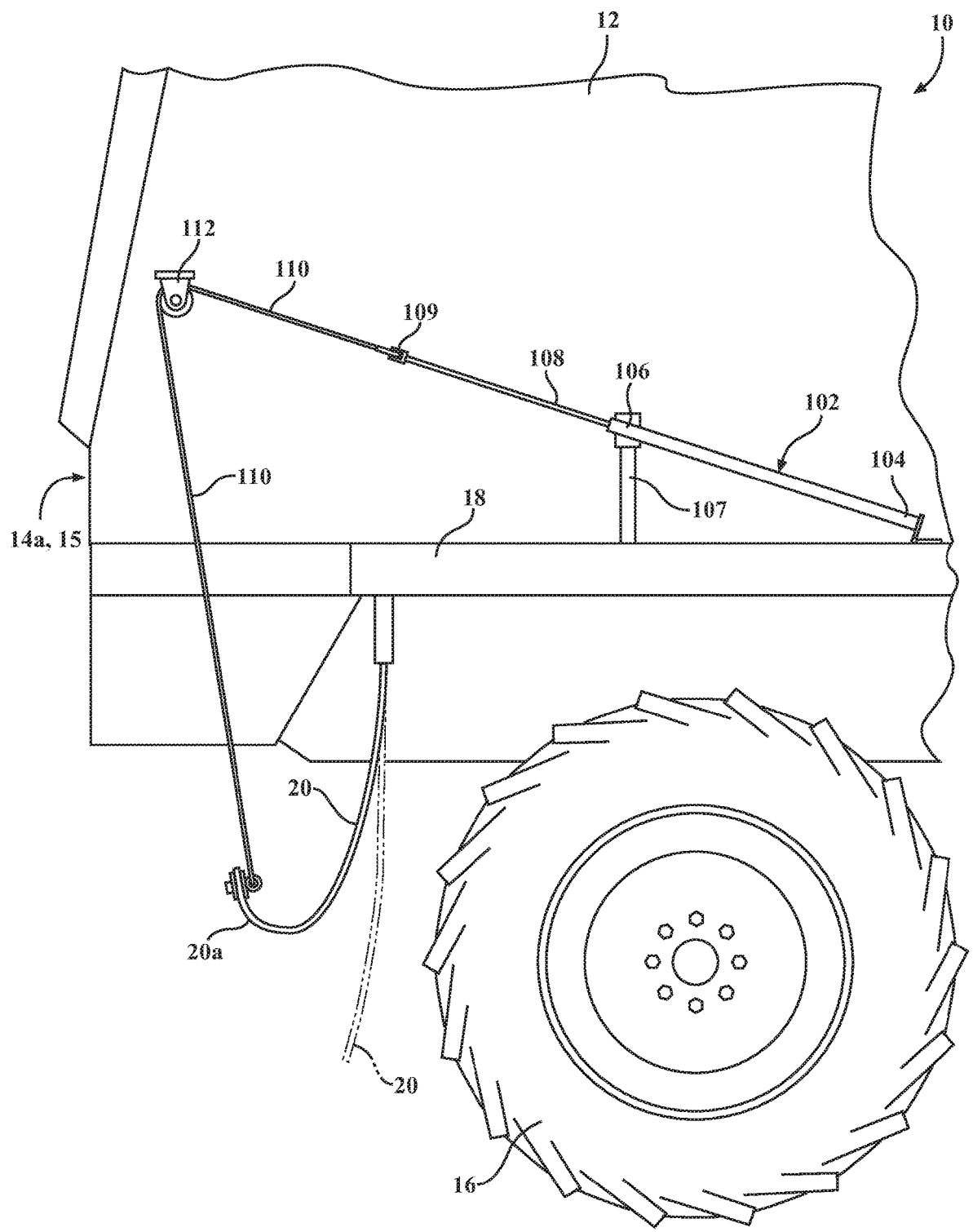
FIG. 4 is similar to FIG. 1, showing the mud flap being lifted up and away from the vehicle wheel by the lift system.
Figure 5:
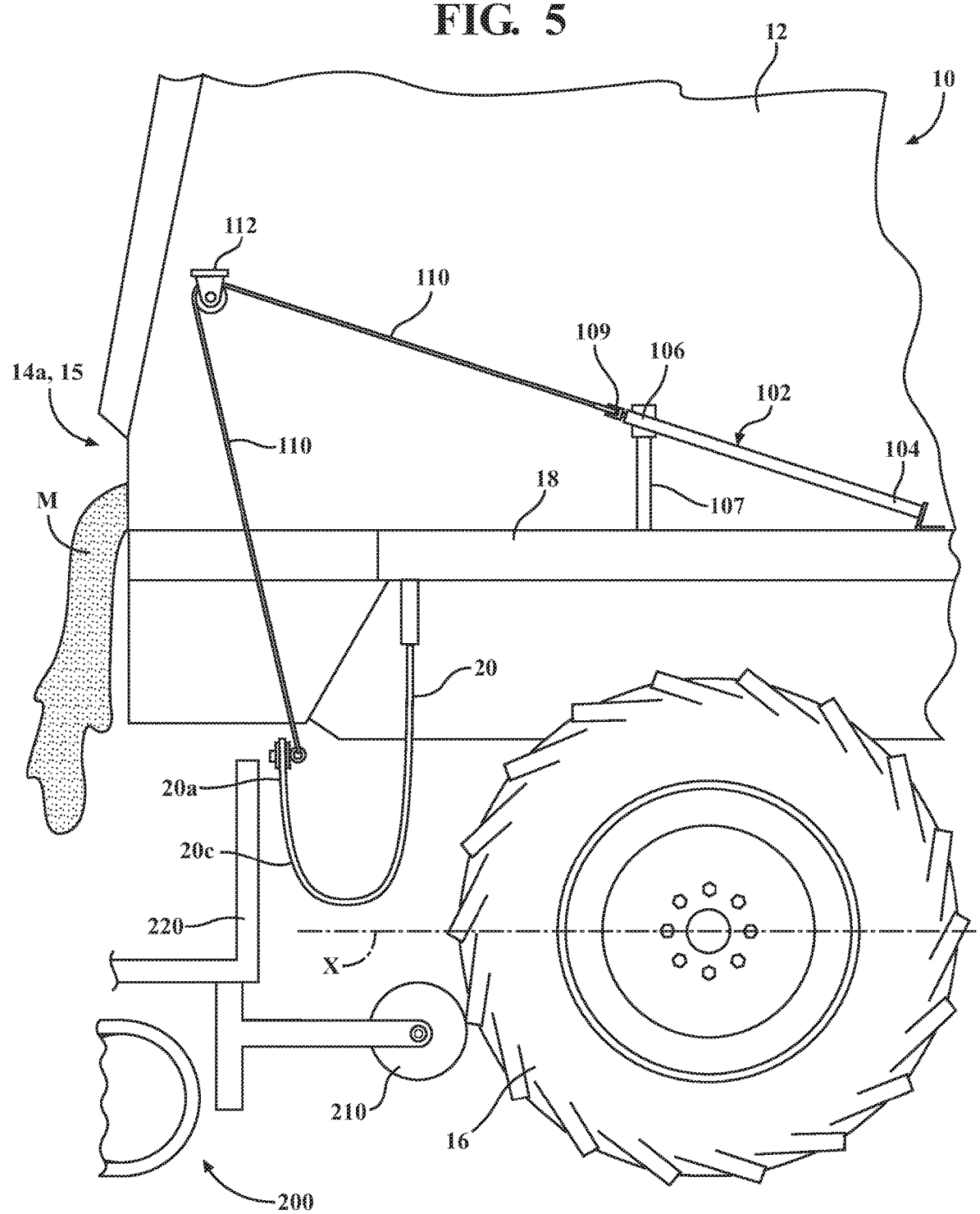
FIG. 5 is similar to FIG. 4, but schematically shows a paving machine engaging the rear end of the live bottom vehicle when the mud flap is held in its fully raised position.

Referring to FIGS. 4 and 5, mud flaps 20 start in a lowered, "extended" position hanging vertically down behind the wheels of trailer 10, with the operating rods 108 and cables 110 associated with each lift cylinder fully extended. When a paving machine 200 (FIG. 5) begins moving into position behind trailer 10, the mud flap lift system 100 is activated via the switch console 130 in cab 122 to switch pneumatic air valve controller 120 to a "lift/retract" state in which pressurized air is supplied to the rear end 106 of each lift cylinder 102 by rear-connected supply line 118, and thus to one side of an internal operating mechanism such as a piston, while any air pressure in the lift cylinder on the opposite (forward) side of the piston is evacuated out the forward-connected line 118 to an exhaust location in known manner. This causes the operating rod 108 of each cylinder to be retracted forwardly and downwardly into the cylinder, pulling the respective cable 110 forwardly through elevated cable guide 112 and thereby lifting the lower portion 20a of the respective mud flap 20 vertically upwardly into a generally U- or J-shaped configuration.

As best shown in FIG. 5, mud flaps 20 are raised into a curved configuration sufficiently that they are located above the height of a paving machine roller 210 as the roller engages the rear trailer wheels 16, e.g. above the centerline X of rear trailer wheels 16. Additionally, the curved configuration of the mud flaps 20 places their lower, curled-up portions in a substantially vertical orientation so that they present inner faces 20c to the paving machine hopper 220. If, as is normal, the paving machine hopper 220 comes near a rear part of trailer 10 as the paving machine roller 210 engages trailer rear wheels 16, the lower portions 20a and in particular the raised faces 20c of mud flaps 20 may function as resilient bumpers between the trailer and the hopper. The substantially vertical tension maintained on the curled-up parts of the mud flaps 20 by cables 110 gives the raised faces 20c of the mud flaps some additional resilient resistance to being forced forwardly by the hopper as it engages the mud flaps.

When the paving operation is finished, paving machine 200 is disengaged from the rear of trailer 10 in known manner. Mud flaps 20 can then be lowered to their extended position by reversing the operation of pneumatic controller 120 from the switch console 130 in cab 122, i.e. by exhausting pressure from the forward ends 104 of cylinders 102 through the forward-connected pneumatic lines 118, and by introducing pressure to the rear ends 106 of the cylinders 102 through the rear-connected pneumatic lines 118. The weight of the mud flaps then causes them to uncurl and resume their normal downwardly-hanging orientation.

Figure 1A:
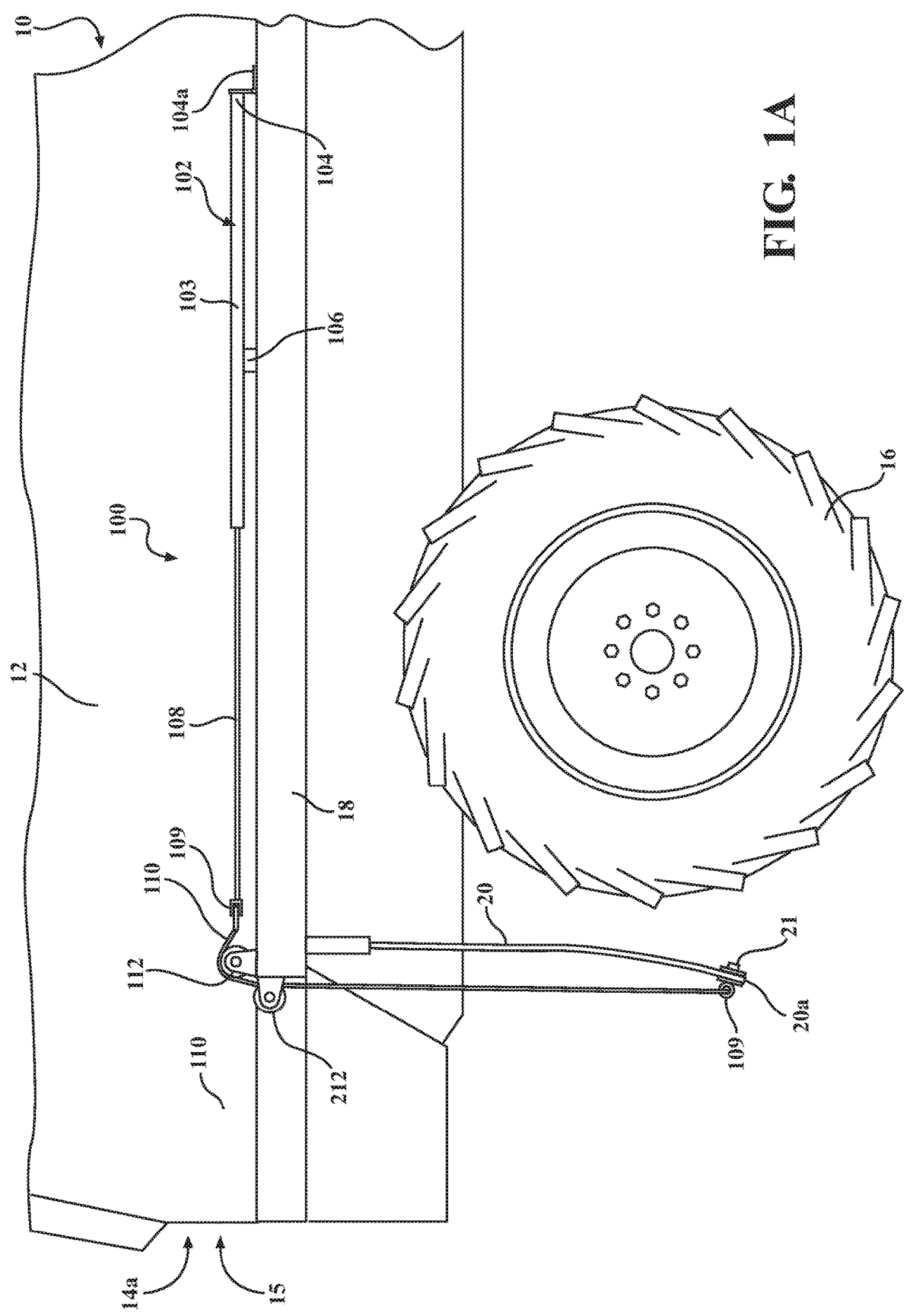
FIG. 1A is a side elevation view similar to FIG. 1, but showing an alternate mounting orientation for the lift cylinder.
Figure 6:
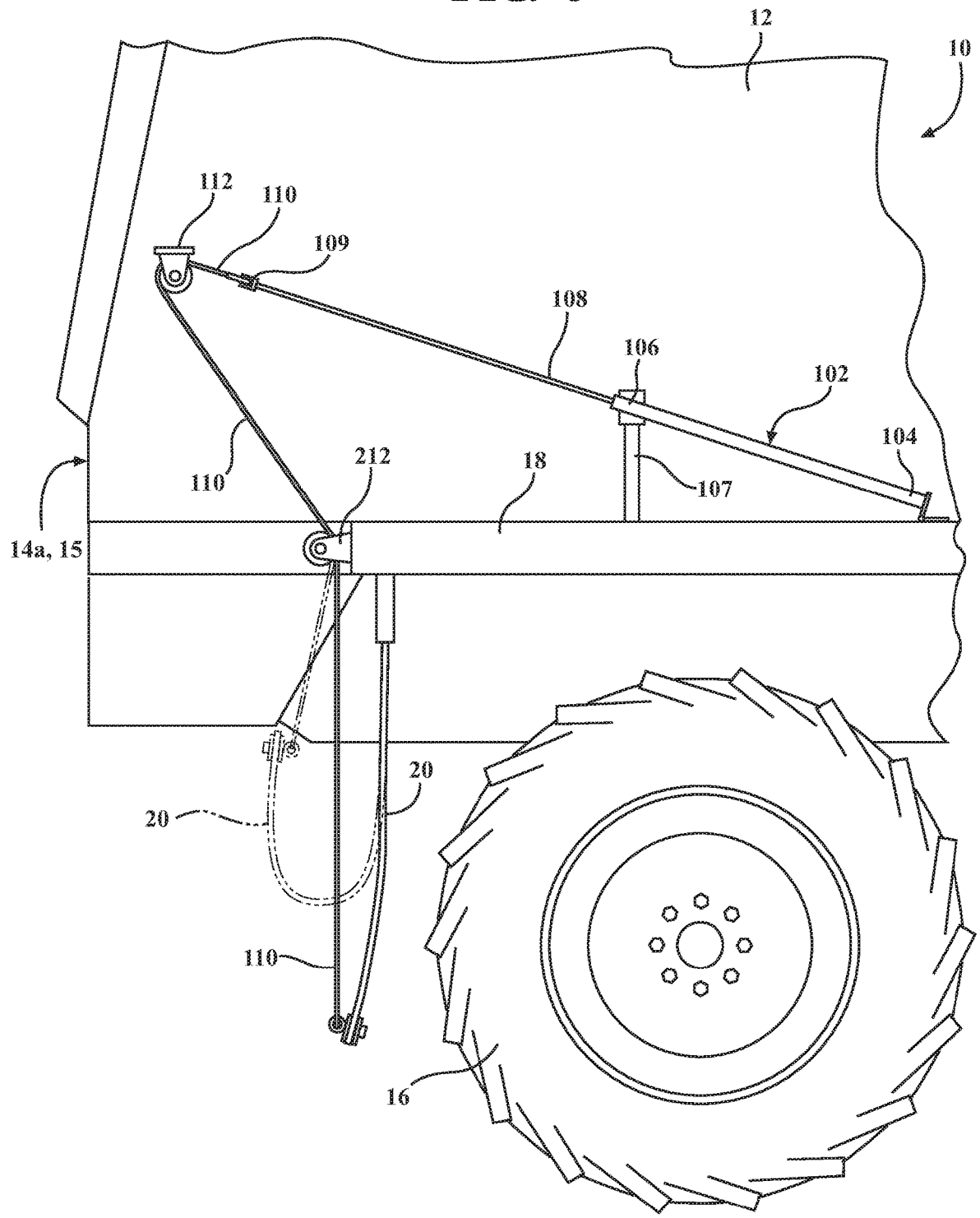
FIG. 6 is similar to FIG. 4, but shows an alternate cable guide arrangement defining a compound cable angle between the upper cable guide and the lower end of the mud flap.

FIG. 6 shows an alternate cable guide arrangement, in which an intermediate cable guide 212 is located between the elevated (upper) cable guide 112 and the mud flap 20, offset forwardly from the upper cable guide 112 to feed the cable 110 at a compound angle from the upper cable guide 112 to the lower end 20a of the mud flap. A good mounting location for the intermediate cable guide 212 is on or adjacent the rear end of the fender 18, as shown. This arrangement puts the lower part of the cable 110 below intermediate guide 212 in a more vertical alignment with the mud flap 20, depending on the position of the upper cable guide 112. It is also possible to place an intermediate cable guide 212 in such an alignment with the mud flap where the upper cable guide 112 is more directly aligned with the mud flap as shown in FIG. 1 in phantom lines or as shown in FIG. 1A in solid lines, for example to keep the cable 110 tensioned close to the fender and vertically oriented without snagging or pulling away from the rear end of the fender 18.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A mud flap lifting system for a live bottom trailer having a load box, a rear load gate for dispensing load material from the load box at a height above the ground to a location behind the load box, rear wheels, and flexible mud flaps associated with the rear wheels, the mud flap lifting system comprising:

a pneumatic lift cylinder located exteriorly of the vehicle load box on a first side of the trailer and associated with a corresponding mud flap, the lift cylinder located forwardly of the rear wheels and the mud flaps and positioned on or above a corresponding vehicle fender;

a first cable guide associated with the lift cylinder and located rearwardly thereof at a height on and above an end portion of the fender and positioned substantially vertically above the corresponding mud flap, and further wherein a rear end of the first lift cylinder is aligned with the first cable guide;

an intermediate cable guide located between the first cable guide and the corresponding mud flap on the end portion of the fender at a location rearward of and below the first cable guide, such that the cable extends downwardly from the first cable guide to the intermediate cable guide and downwardly from the intermediate cable guide to the connection at the lower end of the corresponding mud flap;

a cable operatively associated with the lift cylinder and connected to a retractable and extendable operating portion at the rear end of the lift cylinder, the cable extending rearwardly from the lift cylinder to and through the first cable guide, the cable further extending vertically downwardly from the first cable guide over an outer face of the mud flap to a connection at the lower end of the corresponding mud flap; and a controller for controlling an air supply on the vehicle to selectively actuate the lift cylinder to retract and extend the cable in order to selectively lift and lower a lower portion of the corresponding mud flap outwardly and upwardly away from a corresponding rear wheel and from the corresponding fender;

wherein, the lift cylinder has a sufficient operating range to lift a lower portion of the mud flap into a curved J-shaped or U-shaped configuration spaced above a paving machine roller contact point on the rear wheels.

2. The mud flap lifting system of claim 1, wherein a first mud flap lifting system is located on the first side of the trailer corresponding to a first mud flap, and wherein a second mud flap lifting system is located on a second side of the trailer opposite the first side corresponding to a second mud flap.

3. The mud flap lifting system of claim 2, wherein the first and second mud flap lifting systems are operated simultaneously by the controller which is a single controller.

4. The mud flap lifting system of claim 1, wherein in the curved J-shaped or U-shaped configuration of the mud flap a lower portion of the mud flap is substantially vertical and presents a substantially vertical face for resilient engagement with a front portion of a paving machine hopper.

* * * * *